United States Patent
Callicoat et al.

(10) Patent No.: US 9,350,127 B2
(45) Date of Patent: May 24, 2016

(54) SELF-LOCATING BUSBAR ASSEMBLY AND ALIGNMENT METHOD

(71) Applicant: FORD GLOBAL TECHNOLOGIES, LLC, Dearborn, MI (US)

(72) Inventors: Debbi Callicoat, Livonia, MI (US); Brian Utley, Canton, MI (US); Derek Hartl, Royal Oak, MI (US); Steve Droste, Dearborn, MI (US); Yunan Guo, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

(21) Appl. No.: 14/223,719

(22) Filed: Mar. 24, 2014

(65) Prior Publication Data
US 2015/0270666 A1    Sep. 24, 2015

(51) Int. Cl.
| H01R 31/08 | (2006.01) |
| H01R 25/16 | (2006.01) |
| H01R 43/00 | (2006.01) |
| H01M 2/20 | (2006.01) |
| H01R 11/28 | (2006.01) |

(52) U.S. Cl.
CPC .............. *H01R 25/16* (2013.01); *H01M 2/20* (2013.01); *H01R 43/00* (2013.01); *H01R 11/288* (2013.01); *H01R 25/162* (2013.01); *Y10T 29/49174* (2015.01)

(58) Field of Classification Search
CPC ................................. H01R 31/08; Y02E 60/12
USPC ..................................... 439/511, 627; 429/160
See application file for complete search history.

(56) References Cited

U.S. PATENT DOCUMENTS

| 7,381,093 | B2 | 6/2008 | Shimamori et al. | |
|---|---|---|---|---|
| 7,499,262 | B1 | 3/2009 | Darr | |
| 8,038,487 | B2 * | 10/2011 | Tsuchiya | H01M 2/202 429/160 |
| 8,197,962 | B2 * | 6/2012 | Itoi | H01M 2/105 429/151 |
| 8,501,340 | B2 * | 8/2013 | Kim | H01M 2/202 429/121 |
| 8,574,008 | B2 * | 11/2013 | Große | H01M 2/202 439/627 |
| 8,623,544 | B2 * | 1/2014 | Tsuchiya | H01M 2/202 429/163 |
| 2006/0145657 | A1 | 7/2006 | Hashida et al. | |
| 2009/0075163 | A1 | 3/2009 | Shevock et al. | |
| 2012/0244397 | A1 | 9/2012 | TenHouten et al. | |

\* cited by examiner

*Primary Examiner* — Thanh Tam Le
(74) *Attorney, Agent, or Firm* — David Kelley, Esq.; Tung & Associates

(57) ABSTRACT

A self-locating bus bar assembly for locating a bus bar on a cell terminal of a battery cell includes a bus bar locating tab adapted for attachment to the bus bar; an assembly bracket; a tab opening in the assembly bracket, the tab opening sized and configured to accommodate the bus bar locating tab; and a bracket terminal opening in the assembly bracket, the bracket terminal opening sized, configured and located to accommodate the cell terminal of the battery cell when the bus bar locating tab is disposed within the tab opening.

20 Claims, 4 Drawing Sheets

SELF-LOCATING BUSBAR ASSEMBLY AND ALIGNMENT METHOD

FIELD

Illustrative embodiments of the disclosure generally relate to electrical bus bars for electric vehicles (EVs). More particularly, illustrative embodiments of the disclosure relate to a self-locating bus bar assembly and alignment method which precisely locates a bus bar relative to a cell terminal on an HV battery.

BACKGROUND

Bus bars for HV (hybrid vehicle) battery arrays may be attached via studs on the battery cells. Nuts may be threaded and tightened on the studs to form a strong, electrically-conductive joint. The studs may be used to locate the bus bars in the correct location for contact of the bus bars with the cell terminal on the battery cell.

In some applications, it may be desirable to attach the bus bars to the cell terminals on the battery cell via welding. Therefore, a self-locating bus bar assembly and alignment method which precisely locates a bus bar relative to a cell terminal on an HV battery may be desirable.

SUMMARY

A self-locating bus bar assembly for locating a bus bar on a cell terminal of a battery cell includes a bus bar locating tab adapted for attachment to the bus bar; an assembly bracket; a tab opening in the assembly bracket, the tab opening sized and configured to accommodate the bus bar locating tab; and a bracket terminal opening in the assembly bracket, the bracket terminal opening sized, configured and located to accommodate the cell terminal of the battery cell when the bus bar locating tab is disposed within the tab opening.

BRIEF DESCRIPTION OF THE DRAWINGS

Illustrative embodiments of the disclosure will now be described, by way of example, with reference to the accompanying drawings, in which.

DETAILED DESCRIPTION

Figure 1:
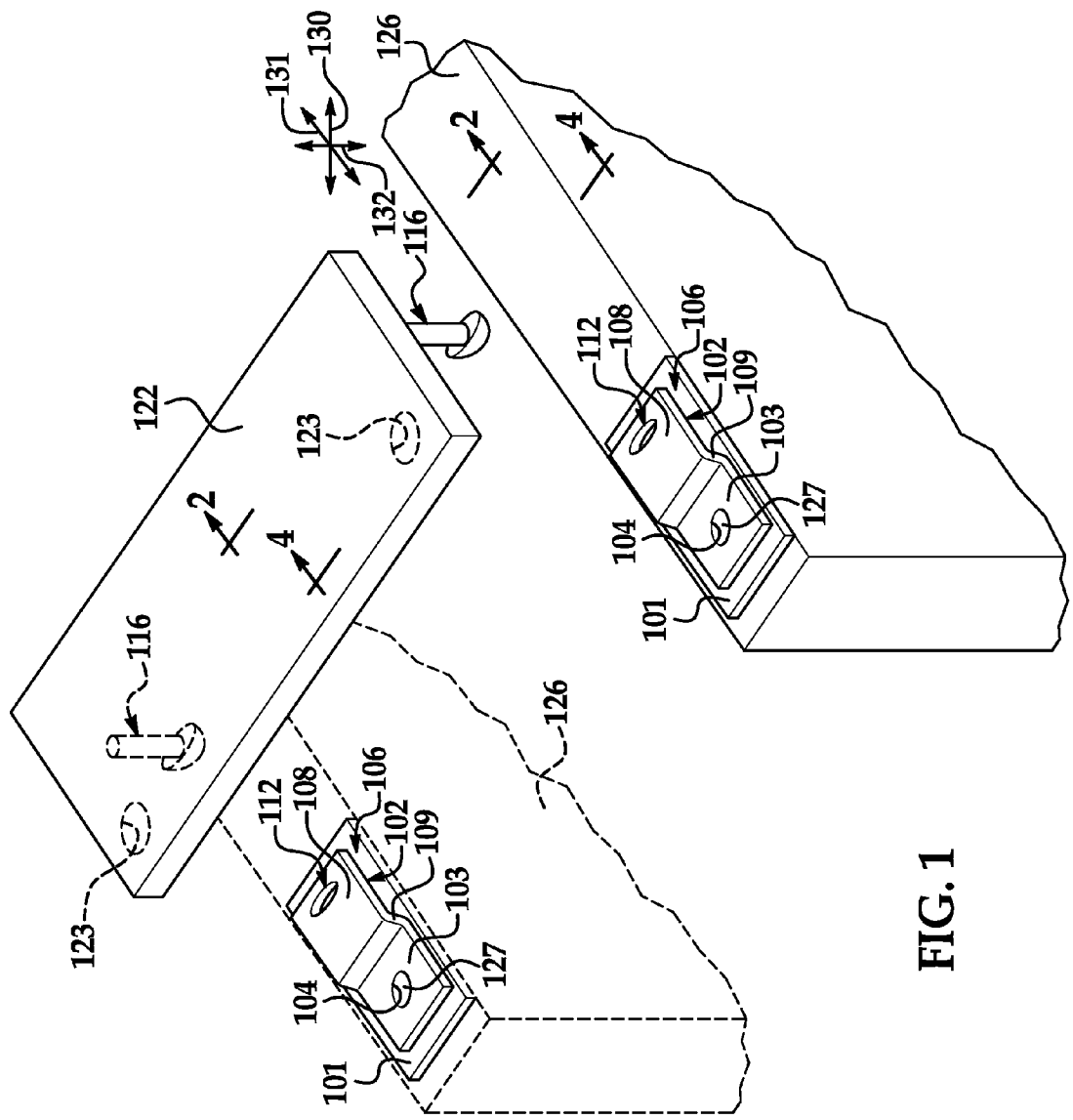
FIG. 1 is an exploded perspective view of an illustrative embodiment of the self locating bus bar assembly in locating a bus bar (partially in section) relative to cell terminals on a pair of HV batteries, respectively (one of which is shown in phantom) in exemplary application of the assembly.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Referring to the drawings, an illustrative embodiment of the self locating bus bar assembly, hereinafter assembly, is generally indicated by reference numeral 100. In exemplary application, which will be hereinafter described, the assembly 100 facilitates alignment, along an X axis 130 and a Y axis 131, of a terminal contact 123 on a bus bar 122 with a cell terminal 127 on at least one battery cell 126 of an HV (hybrid vehicle) battery. The assembly 100 may include an assembly base 101. The assembly base 101 may be generally elongated and rectangular in shape. An optional assembly bracket 102 may be supported by the assembly base 101. The optional assembly bracket 102 may include a bracket terminal portion 103 on the assembly base 101 and a bus bar locating portion 108 extending from the bracket terminal portion 103. In some embodiments, the bus bar locating portion 108 and the bracket terminal portion 103 may be fabricated in one piece. The bracket terminal portion 103 may be spot welded to the assembly base 101. The bus bar locating portion 108 may be offset relative to the bracket terminal portion 103. In some embodiments, a bracket connecting portion 109 may connect the bus bar locating portion 108 to the bracket terminal portion 103. A bracket space 106 may be formed by and between the assembly base 101 and the bus bar locating portion 108 of the assembly bracket 102. The bracket terminal portion 103 of the assembly bracket 102 may be attached to the assembly base 101 using mechanical fasteners and/or other suitable attachment technique known by those skilled in the art. Alternatively, the bracket terminal portion 103 of the assembly bracket 102 may be fabricated in one piece with the assembly base 101 according to the knowledge of those skilled in the art.

Figure 4:
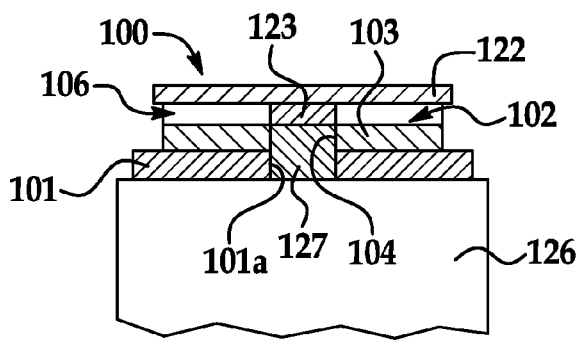
FIG. 4 is a sectional view taken along section lines 4-4 in FIG. 1.

As shown in FIG. 4, a base terminal opening 101a may extend through the assembly base 101. A bracket terminal opening 104 may extend through the bracket terminal portion 103 of the assembly bracket 102. The bracket terminal opening 104 of the assembly bracket 102 registers with the base terminal opening 101a of the assembly base 101. In exemplary application of the assembly 101, which will be hereinafter described, the base terminal opening 101a and the bracket terminal opening 104 may be sized and configured to accommodate a cell terminal 127 on a HV battery cell 126.

Figure 2:
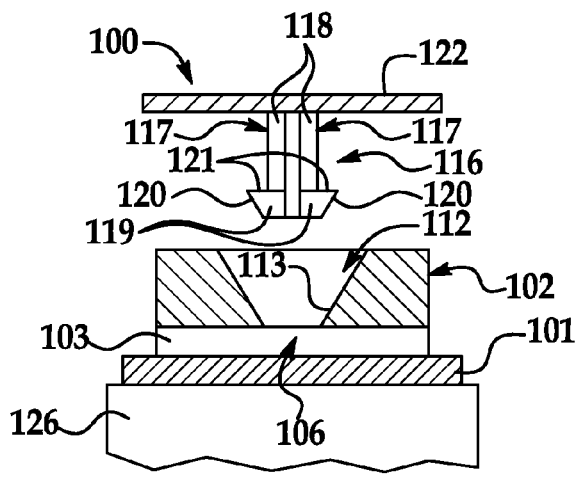
FIG. 2 is an exploded sectional view taken along section lines 2-2 in FIG. 1.
Figure 3:
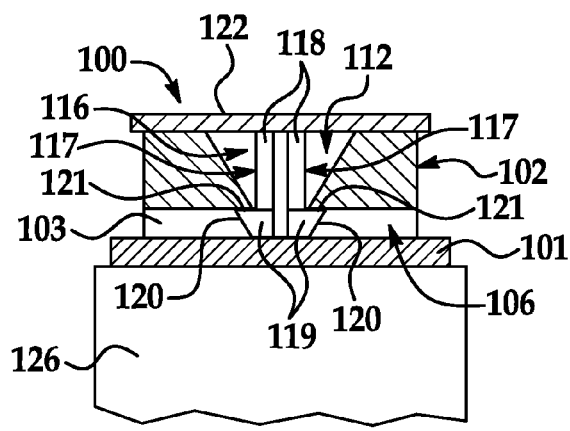
FIG. 3 is a sectional view with the bus bur attached to the cell terminal on the HV battery.

As shown in FIGS. 1-3, a tab opening 112 extends through the bus bar locating portion 108 of the assembly bracket 102. The tab opening 112 may have a beveled tab opening surface 113 (FIG. 2) for purposes which will be hereinafter described.

A flexible or resilient bus bar locating tab 116 may extend downwardly from the bus bar 122. The bus bar locating tab 116 may be attached to the bus bar 122 according to any suitable technique which is known by those skilled in the art and suitable for the purpose. In some embodiments, the bus bar locating tab 116 may be fabricated in one piece with the bus bar 122. In other embodiments, the bus bar locating tab 116 may be attached to the bus bar 122 using a sleeve, clamp, fastener and/or other suitable technique known by those skilled in the art. The distance between the bus bar locating tab 116 and the terminal contact 123 on the bus bar 122 may equal the distance between the tab opening 112 and the bracket terminal opening 104 in the assembly bracket 102.

The bus bar locating tab 116 is configured to securely engage the tab opening 112 in the assembly bracket 102. In some embodiments, the bus bar locating tab 116 may include a pair of spaced-apart, adjacent tab portions 117 which extend downwardly from the bus bar 122. Each tab portion 117 may include a tab shaft 118 which extends from the bus bar 122. A tab head 119 may terminate the extending or distal end of the tab shaft 118. Each tab head 119 may have a beveled outer tab head surface 120 which matches the angle of the beveled tab opening surface 113 in the tab opening 112. A bracket engaging surface 121 on each tab head 119 faces the tab shaft 118.

In exemplary application, the assembly 100 facilitates X and Y axis alignment of a terminal contact 123 on a bus bar 122 with a cell terminal 127 on at least one battery cell 126 of an HV (hybrid vehicle) battery. In some applications, the assembly 100 may facilitate X and Y axis alignment of terminal contacts 123 on a bus bar 122 with cell terminals 127 on a pair of battery cells 126, as shown in phantom in FIG. 1. The assembly base 101 of the assembly 100 may be attached to the HV battery cell 126 using welding, mechanical fasteners and/or other suitable attachment technique. As shown in FIGS. 1 and 2, the bus bar locating tab 116 is initially registered or aligned with the tab opening 112 in the assembly bracket 102 and then pressed along the Z axis 132 into the tab opening 112. Accordingly, the beveled outer tab head surfaces 120 on the tab heads 119 of the respective tab portions 117 engage the beveled tab opening surface 113 in the tab opening 112, which presses or deforms the tab portions 117 toward each other. Therefore, the bus bar locating tab 116, guided by the tab opening surface 113 of the tab opening 112, moves the bus bar 122 along the X axis 130 and the Y axis 131 such that the terminal contact 123 on the bus bar 122 is aligned with the bracket terminal opening 104 in the bracket terminal portion 103 of the assembly bracket 102. When the tab heads 119 of the respective tab portions 117 clear the bottom of the tab opening 112 and are disposed within the bracket space 106, the flexible tab shafts 118 flex outwardly such that the bracket engaging surfaces 121 on the respective tab heads 119 engage the lower surface of the bus bar locating portion 108 of the assembly bracket 102 to lock or retain the bus bar locating tab 116 in the tab opening 112. Thus, the bus bar locating tab 116 snaps into the tab opening 112 and secures the bus bar 122 onto the assembly bracket 102, as shown in FIG. 3, with the terminal contact 123 on the bus bar 122 in solid contact with the cell terminal 127 of the HV battery cell 126, as shown in FIG. 4. In some applications, the terminal contact 123 on the bus bar 122 may be welded to the cell terminal 127 of the HV battery cell 126. In some applications, the bus bar 122 may be welded to the Top of the bus bar locating portion 108 of the assembly bracket 102.

Figure 5:
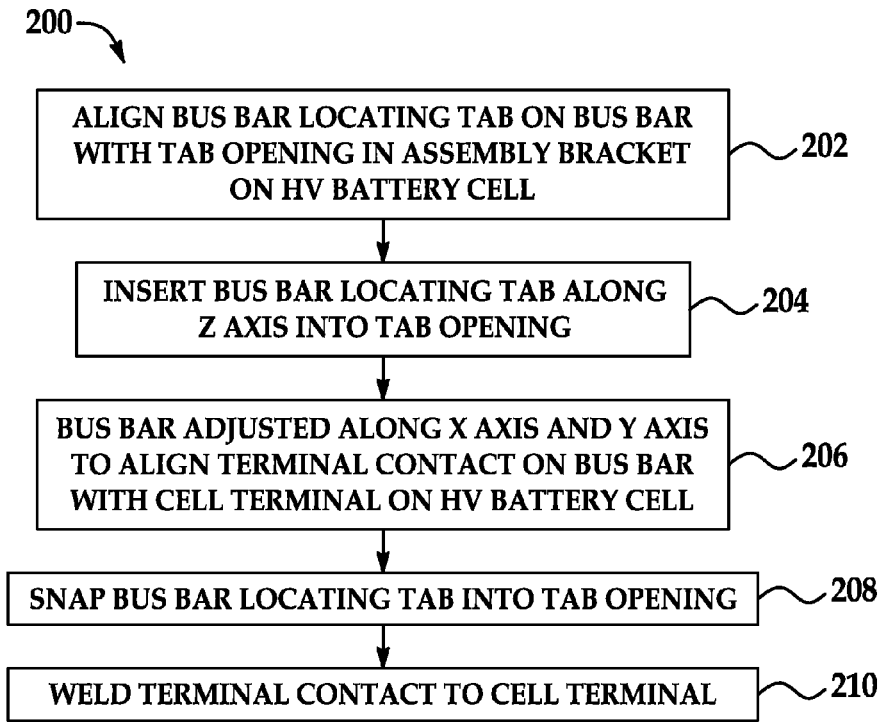
FIG. 5 is a flow diagram of an illustrative embodiment of a self-locating bus bar alignment method.

Referring next to FIG. 5, a flow diagram 200 of an illustrative embodiment of a self-locating bus bar alignment method is shown. In block 202, a bus bar locating tab on a bus bar is aligned with a tab opening in an assembly bracket on an HV battery cell. In block 204, the bus bar locating tab is inserted along the Z axis into the tab opening. In block 206, the bus bar is adjusted along the X axis and the Y axis to align the terminal contact on the bus bar with the cell terminal on the HV battery cell as the bus bar locating tab is extended into the tab opening. In block 208, the bus bar locating tab is snapped into the tab opening. In block 210, the terminal contact may be welded to the cell terminal.

Figure 6:
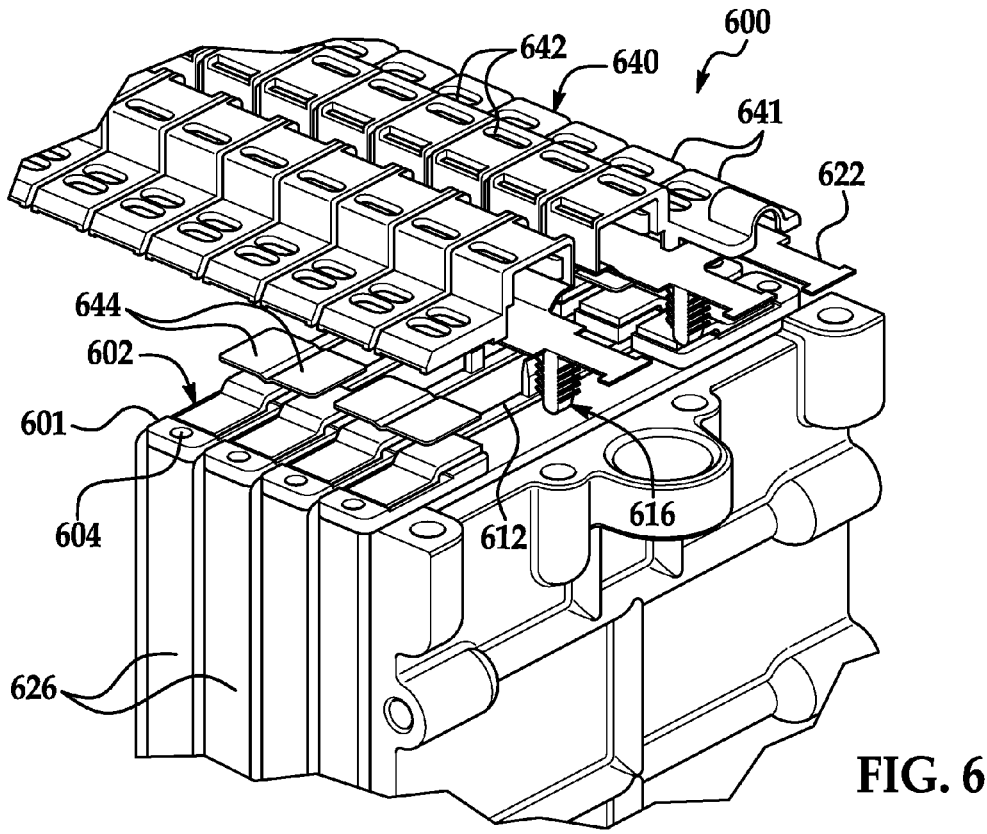
FIG. 6 is a top perspective view, partially in section, of an illustrative embodiment of the self locating bus bar assembly, more particularly illustrating an exemplary bus bar holder with the bus bar of the assembly held by the bus bar holder and attached to an array of prismatic battery cells.
Figure 7:
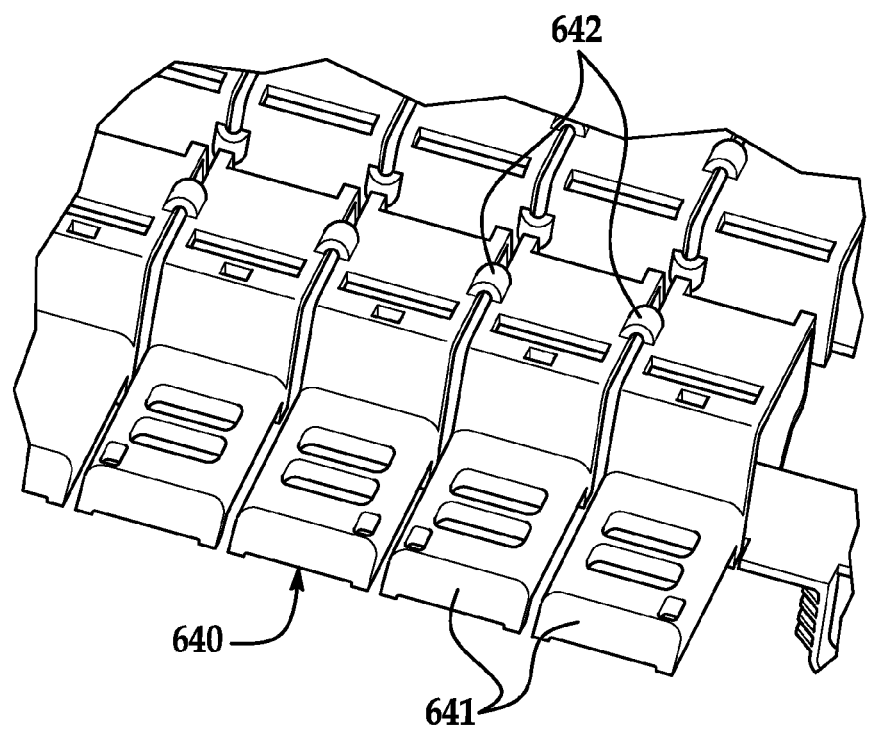
FIG. 7 is a top perspective view, partially in section, of the exemplary bus bar holder.
Figure 8:
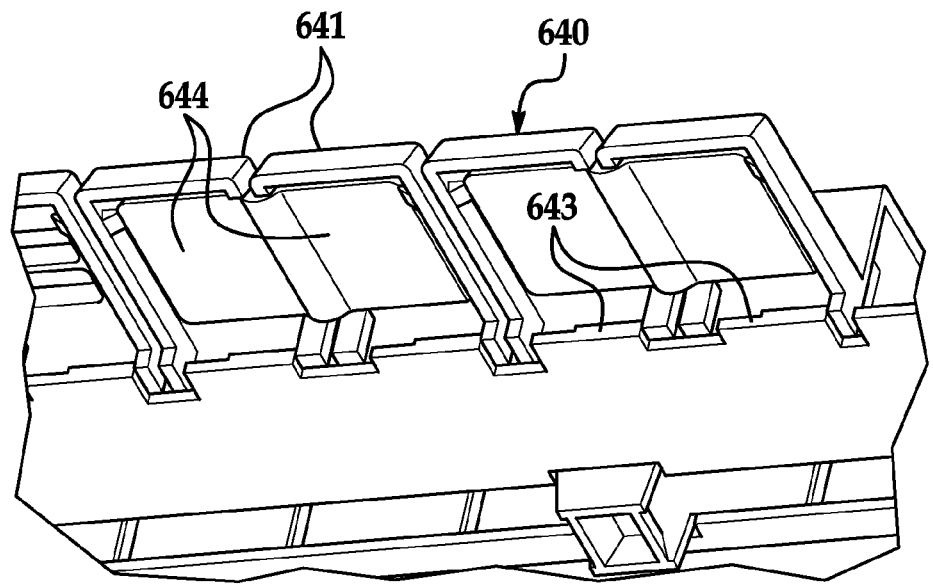
FIG. 8 is a bottom perspective view, partially in section, of the exemplary bus bar holder.

Referring next to FIGS. 6-8, an exemplary bus bar holder 640 with a bus bar 622 of the assembly 600 held by the bus bar holder 640 and attached to an array of prismatic battery cells 626 is shown. The bus bar holder 640 may be plastic and may include multiple, adjacent bus bar holder sections 641. The bus bar holder sections 641 may be sized and shaped to accommodate at least one bus bar 622. Living bus bar section hinges 642 may pivotally connect adjacent bus bar holder sections 641 to each other in the bus bar holder 640. As illustrated in FIG. 8, multiple potential bus bar locating tab positions 643 may be included beneath the respective bus bar holder sections 641 to accommodate the bus bar locating tab 116 of the bus bar 622. Cell to cell bus bars 644 may be provided beneath the respective bus bar holder sections 641 and adjacent to the respective bus bar locating tab positions 643. Adjacent pairs of the cell to cell bus bars 644 may be disposed in electrical contact with respect to each other.

Exemplary application of the assembly 600 may be as was heretofore described with respect to the assembly 100 in FIGS. 1-4. The bus bars 622 are inserted in the respective bus bar holders 640. The bus bar locating tabs 116 on the bus bars 622 are inserted in the tab openings 612 in the respective assembly brackets 602. The cell to cell bus bars 644 establish electric contact between adjacent pairs of the prismatic battery cells 626.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A self-locating bus bar assembly for locating a bus bar on a cell terminal of a battery cell, comprising:
   an assembly bracket having a bracket terminal opening sized, configured and located to accommodate the cell terminal of the battery cell, a terminal contact on said bus bar configured to be substantially aligned with said cell terminal when a bus bar locating tab attached to and extending downwardly from a bottom surface of said bus bar is disposed within a tab opening in said assembly bracket.

2. The assembly of claim 1 further comprising an assembly base configured to attach to the battery cell, and wherein the assembly bracket is carried by the assembly base.

3. The assembly of claim 2 wherein the assembly bracket comprises a bracket terminal portion carried by the assembly base and a bus bar locating portion carried by the bracket terminal portion, and wherein the bracket terminal opening extends through the bracket terminal portion and the tab opening extends through the bus bar locating portion.

4. The assembly of claim 3 wherein the bus bar locating portion is offset relative to the bracket terminal portion.

5. The assembly of claim 4 further comprising a bracket connecting portion connecting the bus bar locating portion to the bracket terminal portion.

6. The assembly of claim 1 wherein the bus bar locating tab comprises a pair of resilient, spaced-apart, adjacent tab portions.

7. The assembly of claim 6 wherein each of the tab portions comprises a tab shaft attached to the bus bar and a tab head terminating the tab shaft.

8. The assembly of claim 7 wherein the tab head comprises a beveled outer tab head surface and a bracket engaging surface facing the tab shaft.

9. A self-locating bus bar assembly for locating a bus bar on a cell terminal of a battery cell, comprising:
  a bus bar;
  a terminal contact carried by the bus bar;
  a bus bar locating tab attached to and extending downwardly from a bottom surface of the bus bar, the bus bar locating tab disposed at a first distance from the terminal contact;
  an assembly bracket adapted for attachment to the battery cell;
  a tab opening in the assembly bracket, the tab opening sized and configured to accommodate the bus bar locating tab; and
  a bracket terminal opening in the assembly bracket at a second distance from the tab opening, the second distance equal to the first distance and the bracket terminal opening sized, configured and located to accommodate the cell terminal of the battery cell, the terminal contact configured to be substantially aligned with the cell terminal when the bus bar locating tab is disposed within the tab opening.

10. The assembly of claim 9 further comprising an assembly base configured to attach to the battery cell, and wherein the assembly bracket is carried by the assembly base.

11. The assembly of claim 10 wherein the assembly bracket comprises a bracket terminal portion carried by the assembly base and a bus bar locating portion carried by the bracket terminal portion, and wherein the bracket terminal opening extends through the bracket terminal portion and the tab opening extends through the bus bar locating portion.

12. The assembly of claim 11 wherein the bus bar locating portion is offset relative to the bracket terminal portion.

13. The assembly of claim 12 further comprising a bracket connecting portion connecting the bus bar locating portion to the bracket terminal portion.

14. The assembly of claim 9 wherein the bus bar locating tab comprises a pair of resilient, spaced-apart, adjacent tab portions.

15. The assembly of claim 14 wherein each of the tab portions comprises a tab shaft attached to the bus bar and a tab head terminating the tab shaft.

16. The assembly of claim 15 wherein the tab head comprises a beveled outer tab head surface and a bracket engaging surface facing the tab shaft.

17. A method of locating a bus bar relative to a cell terminal on a battery cell, comprising:
  aligning a bus bar locating tab attached to and extending downwardly from a bottom surface of the bus bar with a tab opening in an assembly bracket on the battery cell; and
  inserting the bus bar locating tab into the tab opening such that the bus bar is adjusted to substantially align a terminal contact on the bus bar with the cell terminal on the battery cell.

18. The method of claim 17 further comprising snapping the bus bar locating tab into the tab opening.

19. The method of claim 17 wherein inserting the bus bar locating tab into the tab opening such that the bus bar is adjusted to align a terminal contact on the bus bar with the cell terminal on the battery cell comprises inserting the bus bar locating tab into the tab opening such that the bus bar is adjusted along X and Y axes to align a terminal contact on the bus bar with the cell terminal on the battery cell.

20. The method of claim 17 wherein aligning a bus bar locating tab on the bus bar with a tab opening in an assembly bracket on the battery cell comprises aligning a bus bar locating tab on the bus bar with a tab opening having a beveled tab opening surface in an assembly bracket on the battery cell.

* * * * *